April 11, 1967  E. G. PINTO  3,313,068
AUDITORIUM WITH A RING OF SEATS AND A PLURALITY OF SCREENS
Filed April 23, 1965  5 Sheets-Sheet 1

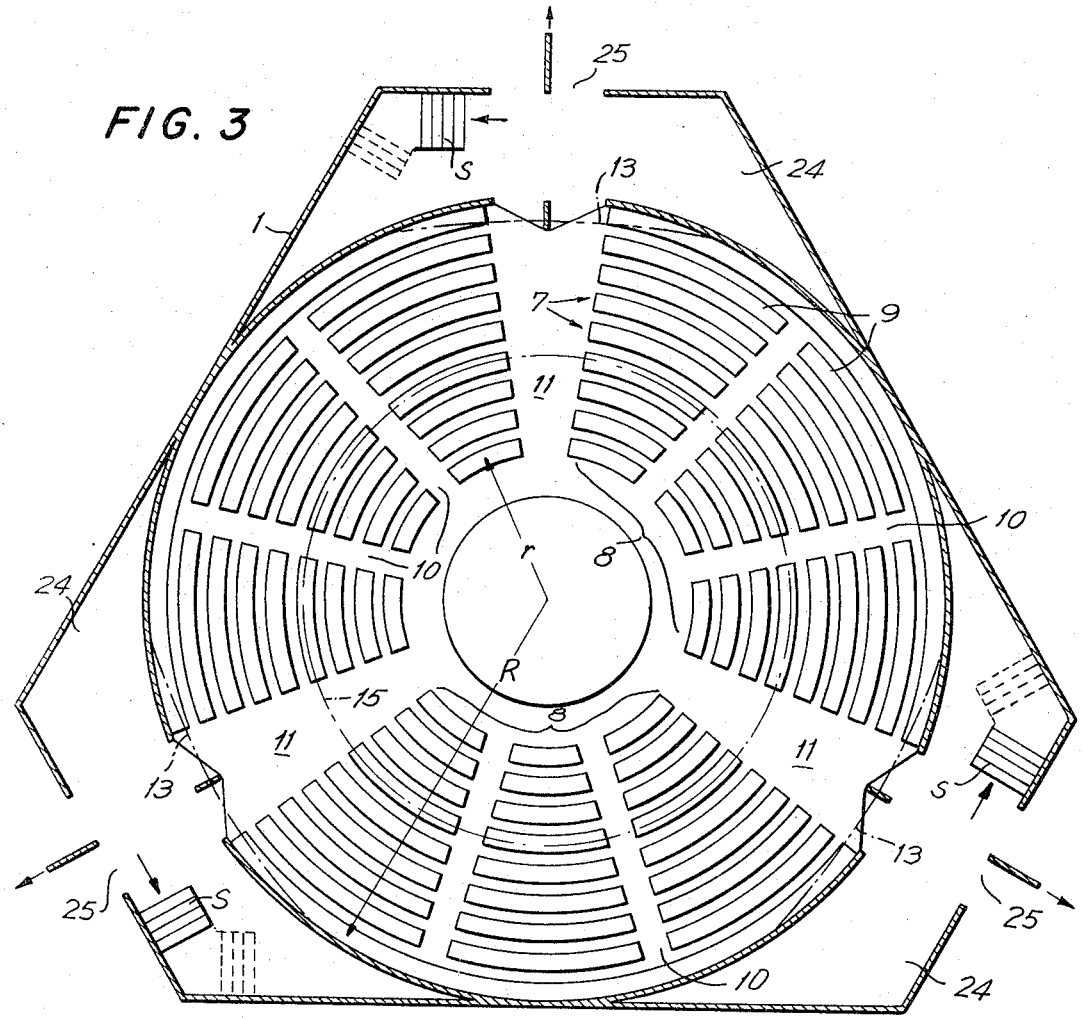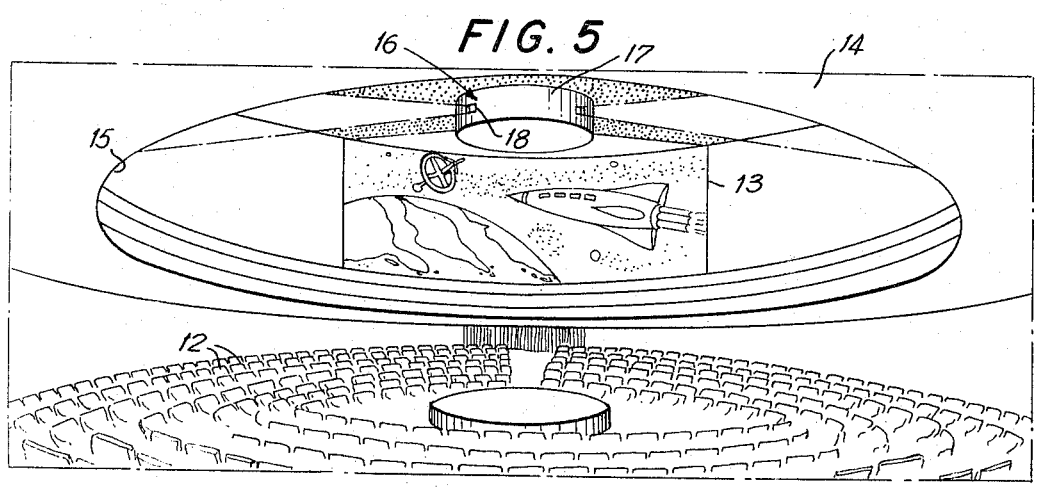

April 11, 1967 E. G. PINTO 3,313,068
AUDITORIUM WITH A RING OF SEATS AND A PLURALITY OF SCREENS
Filed April 23, 1965 5 Sheets-Sheet 5

United States Patent Office 3,313,068
Patented Apr. 11, 1967

3,313,068
AUDITORIUM WITH A RING OF SEATS AND
A PLURALITY OF SCREENS
Emilio Guedes Pinto, Rua Greenhalg, 288,
Santos, Sao Paulo, Brazil
Filed Apr. 23, 1965, Ser. No. 450,464
7 Claims. (Cl. 52—8)

This application is a continuation-in-part application of my earlier application Ser. No. 237,076 filed Nov. 13, 1962 now abandoned.

This invention relates to improved theatres or auditoriums adapted for cinematic and television projection and to methods of improving the viewing by spectators in such auditoriums or theatres.

In my new auditorium there is provided comfortable viewing of a screen from any seat in the auditorium with a minimum of distortion.

Moreover, such an auditorium provides an efficiency in space utilization of a magnitude which has heretofore been unknown in conventional theatres and auditoriums.

It is a principal object of my invention to provide an auditorium which has maximum seating capacity for minimum space utilization while providing each spectator in any seat with a complete undistorted view of a screen.

It is a further object of my invention to fully utilize a circular seating area, by employing a plurality of screens, one for each segment of the seating area, wherein the spectators seated in any one segment can view an associated screen.

It is a feature of my invention to employ in association with a circular seating area and a plurality of screens of the above type, baffle means of particular construction to mask or obscure all of the screens except an associated one from each seat.

In accordance with the above objects and features of the invention there is provided an auditorium comprising a ring of seats facing inwardly, and a plurality of screens arranged annularly outside the ring at a level above the seats, the ring being divided into a plurality of sectors, one for each screen, there being provided between the seats and the screens an annular baffle having a central opening through which visibility is afforded from each seat only for an associated screen.

The above construction satisfies a further object of my invention which is to provide visibility of but one of a plurality of screens from any seat in an annular seating arrangement.

A further object of my invention is to provide an auditorium of the above type in which the seats are all on a common horizontal level, thereby eliminating the need for steps or sloping ramps which may lead to accidents in darkened theatres.

A further object of my invention is to provide an auditorium of the above type in which the distance from the screens to the front and rear rows of the associated sector fall within a relatively narrow range, thereby eliminating the objections usually associated with the seats in the front and rear rows as regards distance from the screen, while eliminating the distortion prevailing in the front row seats and side seats in the conventional auditoriums.

A further object of my invention is to provide an auditorium of the above type wherein the seats are each angularly oriented to directly face an associated screen thereby eliminating "neck turning" to view the screen, as in conventional theatres.

In this regard, in a circular theatre of the above type, the seats are located on concentric circles but are angularly oriented to be disposed perpendicular to an arc drawn from the center of the associated screen through the particular seat.

The seats are also upwardly tilted to face the associated screen. By virtue of the grouping of the seats in angular sectors at a substantial distance from the associated screens, the seats are generally tilted within a narrow range of values and may preferably be tilted all at the same angle. The angle of elevation of the line of vision from any one seat to the associated screen falls within a narrow range covering all of the seats.

A further object of my invention is to provide an auditorium of the above type in which at least one further level is interposed between the screens and the ring of seats, there being provided a ring of seats on each additional level which is divided into angular sectors which are in vertical alignment with the sectors in the lower level. Such an auditorium has a frusto-conical shape with the smaller base constituting the lower level. The succeeding levels and baffles have openings defining a further frusto-conical shape which widens upwardly. Visibility of the screens from each of the seats is provided through the openings in the levels and the baffle. By virtue of this arrangement, auditoriums of practically unlimited capacity can be obtained for a given floor space.

An auditorium constructed in accordance with the present invention permits a more efficient utilization of its volumetric capacity and in fact provides a 40% greater seating capacity for a given size floor space. Moreover, this increase in seating capacity can be obtained with seats which are 60% larger in seating area.

A further object of my invention is to provide an auditorium of the above type in which an image is simultaneously projected on a plurality of screens from a central interior position along substantially horizontal lines of projection.

In summary, it is seen that an auditorium according to the invention has a number of advantages, several of which are enumerated below:

(1) A circular arrangement of seats can be obtained in which the seats are grouped in sectors and the distance between the screen and the seats of each sector fall within a narrow range. Thereby the spectators will be seated at a distance from a screen falling within a narrow range from all locations in the auditorium.

(2) The seats are located on a horizontal plane, thereby eliminating slopes and steps.

(3) Each seat directly faces an associated screen and is at a sufficient distance from the screen such that an undistorted view of the screen is provided.

(4) All of the seats furnish approximately the same angle of elevation of viewability to the associated screen.

Numerous additional objects, features and advantages of the invention will become apparent from the following description of several embodiments of the invention taken in accordance with the attached drawing, wherein:

FIGURE 3 is a sectional plan view of the auditorium of FIG. 1, taken along line III—III in FIG. 1;

FIGURE 5 is a perspective view from within the auditorium of FIG. 1 to illustrate the mode of viewing of a screen;

Figure 1:
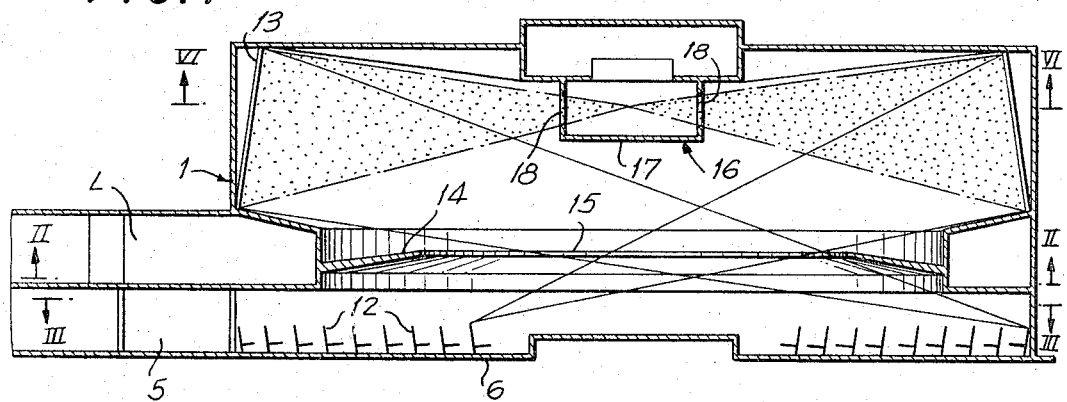
FIGURE 1 is a sectional elevational view of a first embodiment of the auditorium according to the invention.

In the drawing there is shown in FIG. 1 an auditorium or theatre 1, having a seating arrangement on a single level. In the embodiment shown in FIG. 7, a plurality of levels of seats is provided.

Figure 2:
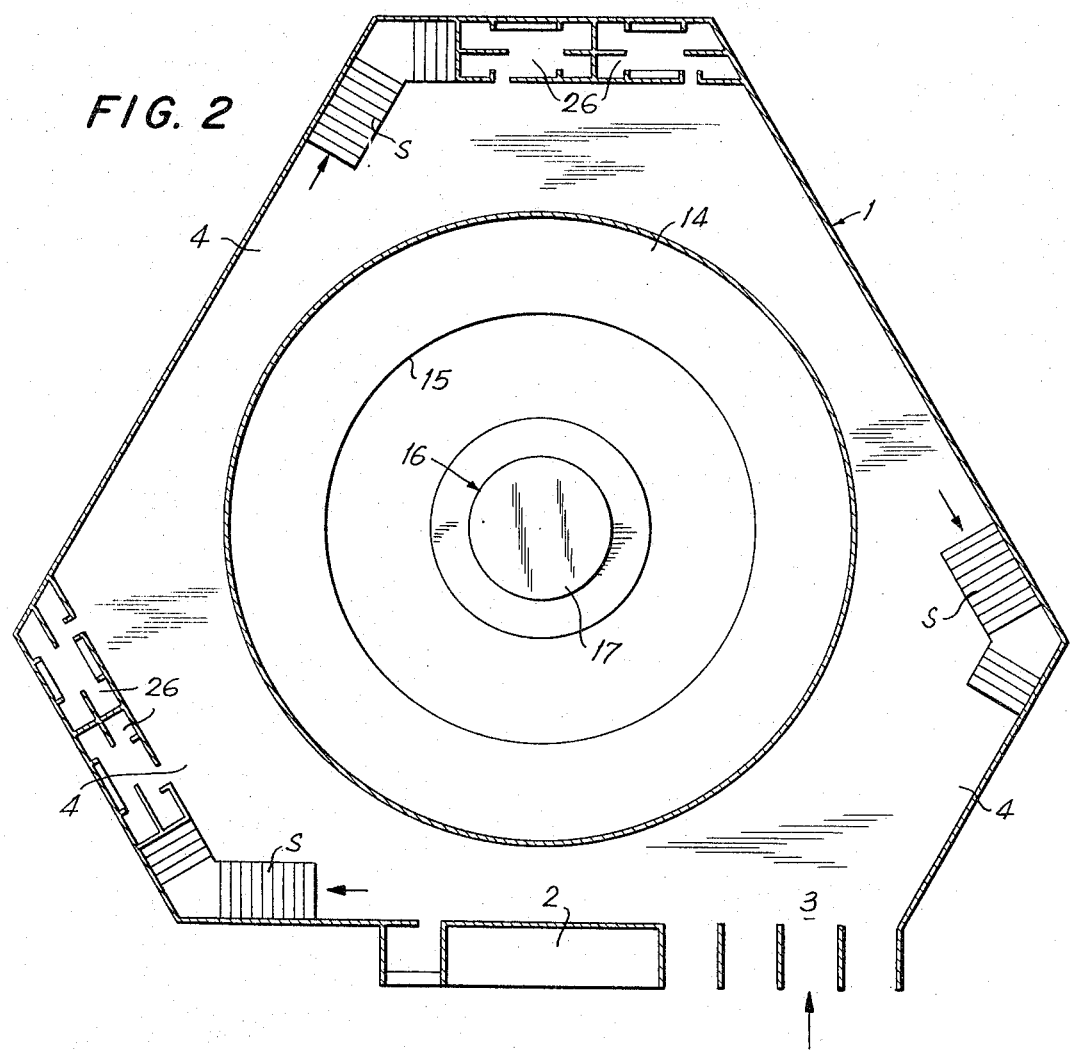
FIGURE 2 is a sectional plan view of the auditorium of FIG. 1, taken along line II—II in FIG. 1.

In the embodiment shown in FIG. 1, there is provided a level L at which entrance to the theatre is permitted. At this level there is provided a ticket booth 2 and an adjacent entrance 3 (FIG. 2). The ticket holders pass through entrance 3 into lobbies or foyers 4, which generally surround the interior of the theatre in which the performance is given. The ticket holders descend the stairs S at convenient locations, to the lower level or seating level 5.

The seating level 5 has a horizontal floor 6 free of steps or slopes. The seats are arranged in rings or concentric rows 7 and are grouped in angular sectors 8. The sectors are further divided into sub-sectors 9, which are separated by aisles 10. Between adjacent sectors 8 are aisles 11, which increase in width in a radially outward direction. This facilitates the exit of the audience from the theatre.

The seats 12 in each of the rows face inwardly. The innermost rows of seats are arranged along a radius $r$, while the outermost rows of seats are arranged along a radius $R$.

A plurality of spaced screens 13 are annularly arranged around the outside of the ring of seats at a level above the seats. Diametrically opposed to each of the sectors 8 is a corresponding screen 13. In the embodiment shown in FIG. 3 there are provided three screens angularly spaced by 120°, and three angular sectors of seats. Each sector 8 is divided into three segments or subsectors 9. A spectator in any one of the seats of a sector will view a corresponding screen 13 by upwardly viewing such screen along a line of vision as, for example, shown in FIG. 1.

In order to mask or obscure all of the screens except the one associated with each sector 8, there is provided baffle means in the form of an annular baffle 14, located at a level above the ring of seats and below the screens 13. The baffle 14 has a central interior opening 15, through which visibility for the screens is afforded for the spectators in the seats. The outline of the opening 15 in baffle 14 has been shown in phantom outline in FIG. 3, in order to facilitate an understanding of the relative position of the baffle with regard to the ring of seats. Similarly, the screens 13 have also been shown in phantom outline in FIG. 3.

The central opening 15 of the baffle 14 has a diameter in relation to the size of the screen and the relative position of the seats, such that the baffle constitutes a mask which substantially obscures for all spectators in seats in any sector all screens other than the one associated with such sector. Thereby, from each seat there will be afforded visibility for only a single screen.

As seen in FIG. 5, the opening 15, when viewed from any of the seats, defines an ellipse with a minor axis corresponding at least to the viewed height of the screen, and a major axis corresponding at least to the viewed width of the screen. From any one seat, the opening allows only a single screen to be visible.

It will be evident that the seats in each sector have been grouped relative to its associated screen in a manner such that the distance from the screen to the first row of seats of such sector is approximately a distance of $R+r$, while the distance to the last row of seats is approximately $2R$. Thereby it is seen that the seats in each sector are generally grouped at a distance lying within a relatively narrow range from the screen, whereby the effects of distortion usually associated with the front rows of seats and side seats are eliminated. Furthermore, if the screens should be located further outwardly at a greater radial distance from the center of the theatre, the ratio of the distance of a screen to its furthest seat and to its closest seat will be even further reduced.

Figure 4:
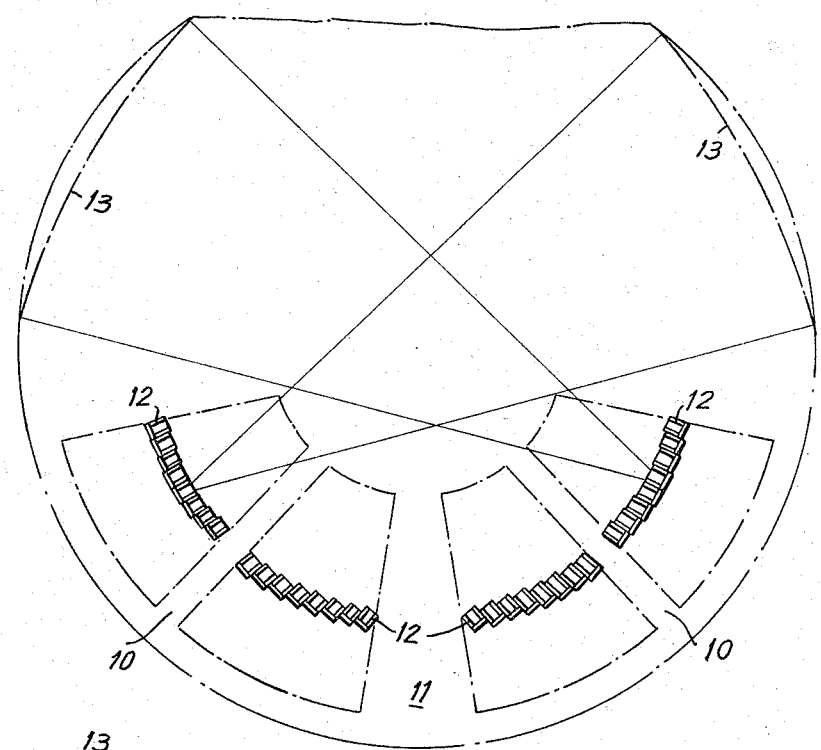
FIGURE 4 shows the arrangement of FIG. 2, with particular emphasis on the orientation of the seats as illustrated in heavy lines.
Figure 6:
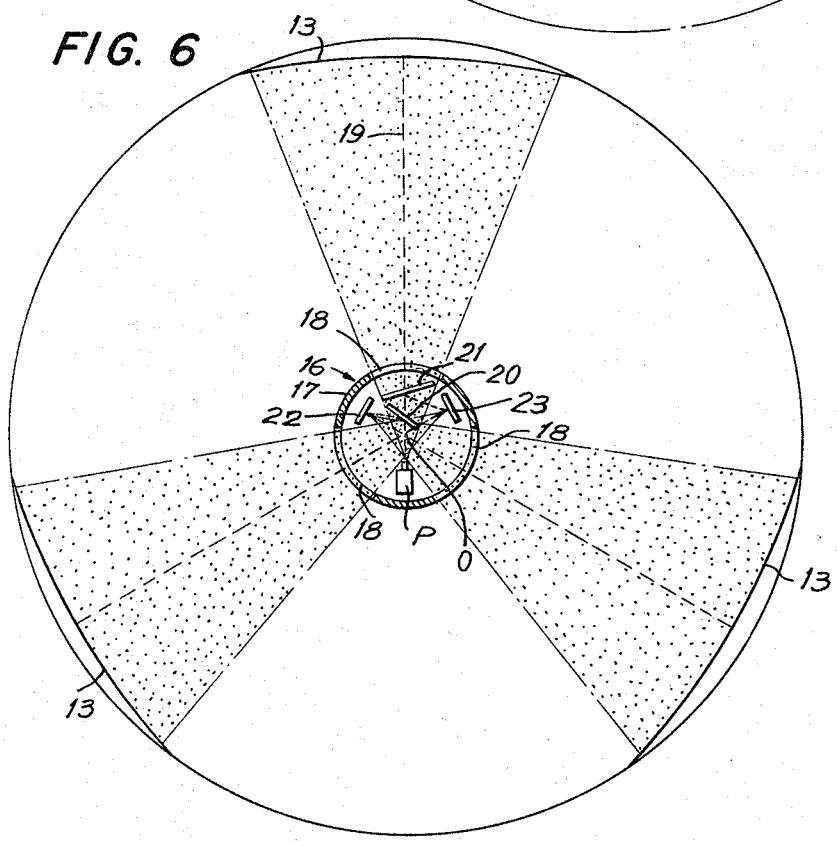
FIGURE 6 is a sectional view taken along line VI—VI in FIG. 1 to illustrate in detail the constructional features of the projecting apparatus according to the invention.

The seats 12 are given a specific angular orientation in order to directly face an associated screen. Thus, although the seats are arranged in rows of concentric circles, nevertheless each seat is angularly oriented in each row to be disposed on a line perpendicular to an arc drawn from the center of the associated screen through the seat. Thereby, the spectator in each seat will be directly facing an associated screen and will not be subjected to any "neck turning," which is normally associated with the side seats in conventional theatres. It is to be seen from FIG. 4 that the seats in the same row across the aisles 11, which separate adjacent sectors, will be angularly oriented in significantly different directions in order to face their respective associated screens which are spaced 120° apart.

The seats 12 are generally tilted upwardly to face the screens at a common angle for all of the seats. This is best illustrated in FIG. 1. As hereinbefore noted, the angles of elevation of the lines of vision between the innermost and outermost rows of seats lie within a narrow range and are substantially constant. Thereby, each spectator will be provided with substantially the same visual image of the associated screen for all seats in any sector. The screens 13 are preferably tilted downwardly to directly face the seats and furnish improved viewing for the spectators.

From the above it will be seen that there has been obtained a substantially complete utilization of the available floor space of the theatre taken in conjunction with a plurality of screens 13 in which each screen is selectively visible only from the seats of an associated sector 8. In this respect it is the specific location and construction of the baffle 14 which makes the viewing possible of only one screen from the seats of each sector. This is to be distinguished from conventional types of "theatres-in-the-round," wherein a single 360° screen is employed. The present invention in effect has combined a plurality of theatres into a single circular theatre, while retaining a certain degree of independence and separation for viewing purposes, all while providing substantially ideal and distortion-free viewing of a screen from any seat in the theatre.

In order to project images on the screens 13 simultaneously, there is provided projection means 16 at the level of the screen for horizontally projecting images thereon. The projection means is housed in a projection booth 17, centrally located within the outline of the screens 13. Generally the screens are positioned perimetrally at a radius corresponding to the outermost row of seats. The screens, however, may have a reduced curvature as compared to said outermost row as, for example, shown in phantom outline in FIG. 3.

The projection means projects images through openings 18 in the projection booth 17 onto the corresponding screens 13. The projection means generally comprises a projector P located somewhat behind a point O disposed centrally between the three screens 13. The projector may be of conventional type and may employ a Xenon lamp of 10,000 lumens. The projector is in alignment with one of the screens 13 to project an image thereon along a beam having a central line of projection 19. A pair of semi-reflecting mirrors 20, 21 are provided, one for each of the other screens. The semi-reflecting mirrors are angularly positioned along line 19 and allow the passage therethrough of the image projected by the projector while reflecting a portion of the image onto corresponding mirrors, 22, 23. Thus, for example, the semi-reflecting mirror 20 is angularly positioned along line 19 to reflect the image onto mirror 22, such that the image is in turn reflected from mirror 22 onto its associated screen 13. Similarly, the third screen receives a reflected image from mirror 23. Consequently, simultaneous image projection on the three screens 13 will be obtained It is to be noted that the projection distance from the projecting means to each screen is relatively small and is less than the distance of the closest seat to its corresponding screen.

While the invention has been described in conjunction with a seating arrangement composed of three sectors and three screens, a greater number of sectors and corresponding screens may be employed. Similarly, at least one further level may be interposed between the baffle 14 and the level of seats 6, as will be described hereinafter in conjunction with the embodiment shown in FIG. 7.

The exit for the audience from the theatre 1 is via the aisles 10 and 11 to a surrounding assembly area 24 and then through exits 25 at lower level 5. It is to be seen that the entry and exit of the spectators is at different levels and it is possible to assemble the audience awaiting entry to the seating level 5 in the lobby at the entrance level L. Meanwhile, the audience which has already viewed the performance may exit at level 5 through exits 25. Thereby, entry and egress from the seating level can be easily accomplished without intermingling of the spectators awaiting the next performance with those who have already seen the previous performance. The rest rooms and lounges 26 are conveniently located at the lobby level L, which has a greater floor area as a result of the penetration thereof above the level of the seats, as best seen in FIGS. 1 and 2.

Figure 7:
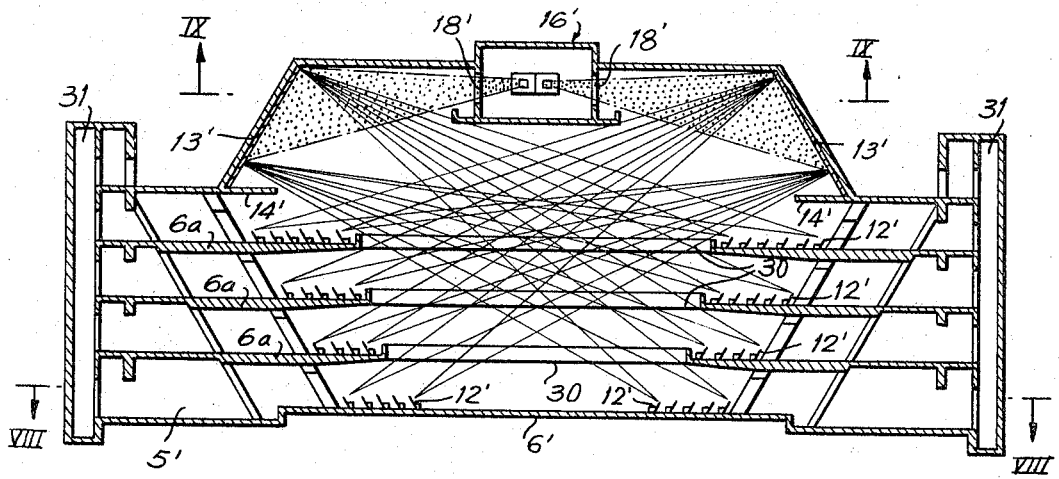
FIGURE 7 is a sectional view similar to that of FIG. 1 for a second embodiment of the auditorium according to the invention.
Figure 9:
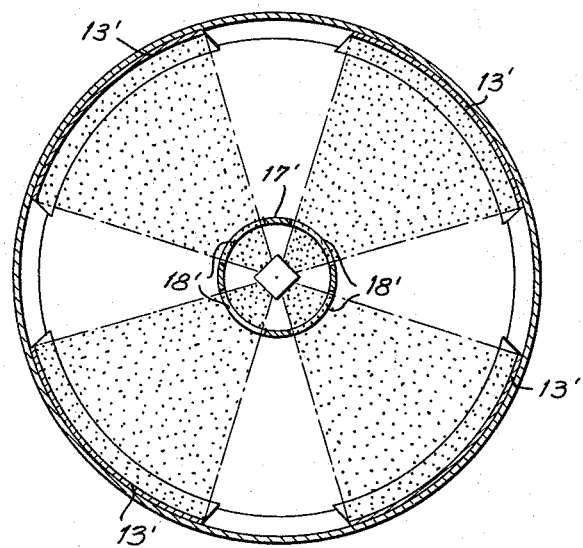
FIGURE 9 is a sectional plan view of the auditorium of FIG. 7 taken along line IX—IX in FIG. 7.
Figure 8:
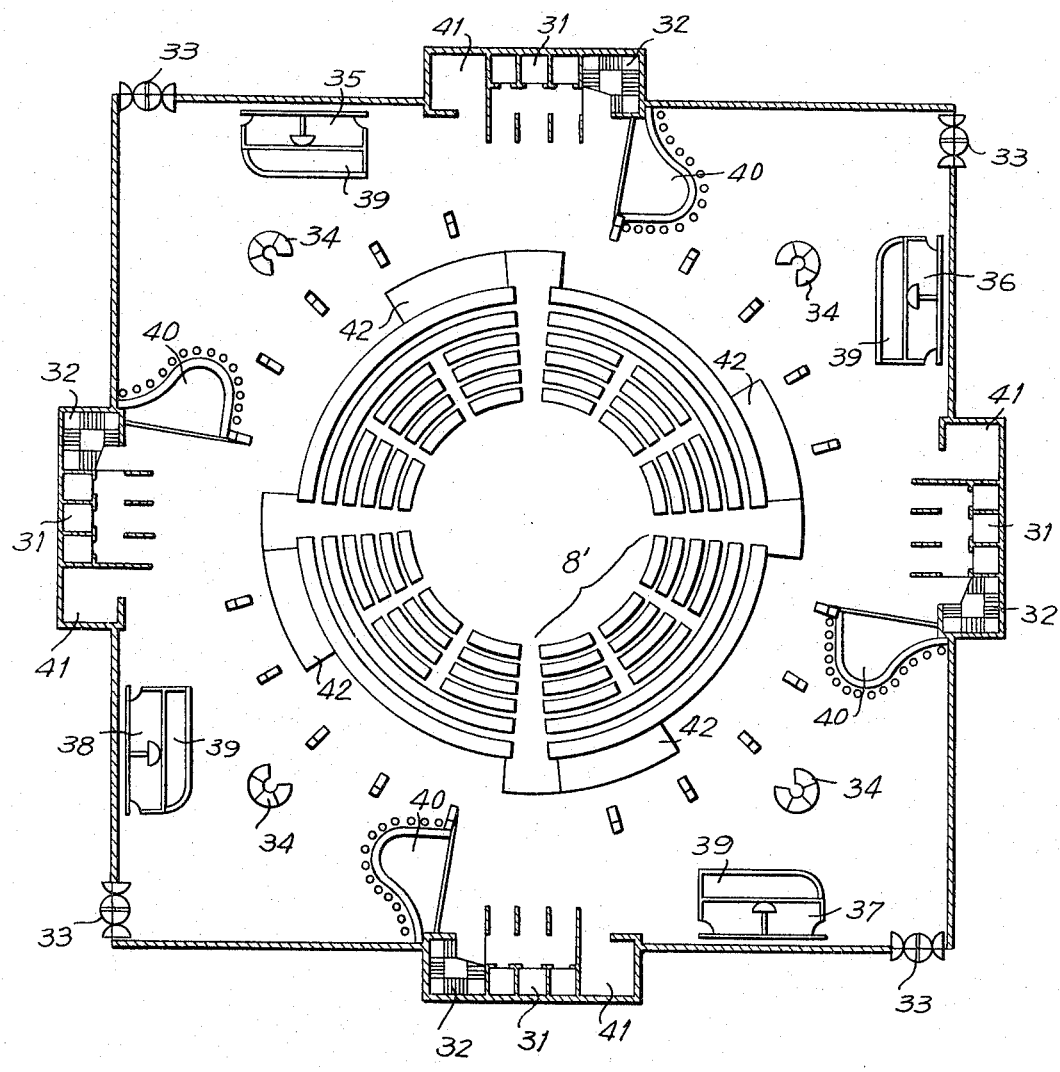
FIGURE 8 is a sectional plan view of the auditorium of FIG. 7 taken along line VIII—VIII of FIG. 7.

In the embodiment shown in FIGS. 7–9, the same reference numerals with a prime subscript will be employed for elements which are similar to those in the embodiment hereinbefore described.

In the embodiment shown in FIGS. 7–9 it will be seen that there are employed four screens instead of three, with four corresponding sectors 8'. Furthermore, there are employed three additional horizontal levels 6a between baffle 14' and lower level 6'. In each of the levels 6a are provided seats 12' arranged in sectors 8', which are in vertical alignment in the sectors in the lower level 6'. Each of the levels 6a has a central opening 30 in order to enable spectators in seats on the lower levels to view the screens 13' through such openings 30. The openings 30 of the levels 6a must be sufficiently large in order not to interfere with the lines of vision from any of the seats in the lower levels to all points of the screen, as shown in FIG. 7, whereby for each seat there will be afforded complete visibility of the associated screen 13'.

The rows of seats at each of the levels have increasing radii. The general configuration of the theatre is of frusto-conical shape, with the smaller base constituting the lower level. The openings 30 in the levels 6a also define a frusto-conical shape which widens upwardly.

By virtue of the above arrangement with a plurality of levels, it is possible to obtain an auditorium of practically unlimited capacity for a given floor space.

In general the number of concentric rows of seats, the dimensions of the level 6a, and the number of levels, depend on the desired total capacity of the auditorium. In the embodiment shown in FIGS 7–9, a total of 3,176 seats may be provided in the theatre. The volume per seat is approximately 150 cu. ft., whereas in conventional auditoriums it varies between 190 and 300 cu. ft.

In order to facilitate movement between levels, there are provided banks of elevators 31 and staircases 32 at given locations in each level, so as to efficiently divide the levels into areas for controlling entry and exit of the audience.

The entry to the theatre is at lower or ground level 5' via doors 33. Level 5' will afford the greatest assembly area by virtue of the smallest diameter of the outermost rows of seats at this level. At level 5' may be provided ticket booths 34 at numerrous locations for the sale of tickets. Also provided at level 5' may be a number of enclosures, such as, for example, a manager's office 35, an office for a fireman 36, a first aid room 37, an office for police 38, cloakrooms 39, concessions 40, rest rooms 41, and the like. Additionally, there are ramps 42 which lead from level 5' to the next upper level 6a.

The arrangement of the projection means 16' in the embodiment shown in FIGS. 7–9, is the same as that in the arrangement shown in the embodiment of FIGS. 1–6, with the exception that four openings 18' are provided in the projection booth 17' in order to project one image for each screen. In the particular projection means employed for the embodiment of FIG. 7, there will be furnished an additional semi-reflecting mirror along the line of projection from the projector to one of the screens and an associated fully reflecting mirror by which an additional image will be obtained for the additional screen.

Moreover, there has been shown in the embodiment of FIGS. 7–9 an arrangement of the screens whereby they are each curved and collectively define a circular outline which is perimetrally located at a distance beyond the outermost row of seats of the uppermost level 6a. As in the embodiment in FIGS. 1–6, the screens in the embodiment of FIGS. 7–9 are downwardly tilted to face the seats in the respective levels.

The seats 12' in the various levels are all generally tilted upwardly at approximately the same angle to face the respective screens directly. Additionally, the seats are angularly oriented in the manner as indicated hereinabove for the embodiment of FIGS. 1–6 so as to directly face the associated screen.

While the invention has been above-described with regard to specific embodiments thereof, numerous modifications and variations will become apparent to those skilled in the art, without departing from the scope and spirit of the invention as defined in the attached claims.

What is claimed is:

1. An auditorium comprising a ring of seats facing inwardly, a plurality of spaced screens annularly arranged around the outside of the ring, the ring being divided into a plurality of sectors, one for each screen, each of the seats in each sector being individually angularly oriented along a line perpendicular to an arc drawn from the center of the associated scren through such seat, said screens being positioned at a level above the seats, a circular baffle above said seats and extending parallel thereto at a level between the screens and the seats, said baffle having a central opening, said opening having a diameter in relation to the size of the scren and the relative position of the ring of seats such that the baffle constitutes a mask which substantially obscures for all spectators in seats in any sector all screens other than the one associated with such sector, said opening when viewed from said seats defining an ellipse with a minor axis corresponding to the viewed height of the screen and a major axis corresponding to the viewed width of the screen, and means centrally located with respect to said screens to project images on said screens which will be visible to spectators in the seats in the respective associated sectors.

2. An auditorium as claimed in claim 1, wherein said seats are located at a common horizontal level, the seats being fixed and tilted upwardly to face the associated screen.

3. An auditorium as claimed in claim 1, wherein said means to project images on said screens comprises a projector positioned in alignment with one of said screens to project an image thereon along a straight line of projection, a plurality of semi-reflecting mirrors, one for each of the other screens, positioned along the line between the projector and said one screen, a reflecting mirror for each semi-reflecting mirror, each reflecting mirror facing the associated screen, said semi-reflecting mirrors being inclined with respect to said line to project an image onto the associated reflecting mirror which in turn reflects the image onto the associated screen.

4. An auditorium as claimed in claim 1 comprising at least one level between the ring of seats and the circular baffle, the additional level including seats arranged in sectors which are in vertical alignment with the sectors in said ring.

5. An auditorium as claimed in claim 1, wherein the screens are curved and collectively define a circular outline.

6. An auditorium as claimed in claim 4, wherein the rows of seats have increasing radii in successively higher levels.

7. An auditorium as claimed in claim 1, wherein the sectors are at least three in number, each sector being subdivided into angular segments.

References Cited by the Examiner

UNITED STATES PATENTS

| 1,660,263 | 2/1928 | Fowler | 52—8 |
| 1,957,947 | 5/1934 | Dreyfuss | 52—6 |

FOREIGN PATENTS

| 488,989 | 1918 | France. |
| 1,204,643 | 1959 | France. |
| 338,974 | 1936 | Italy. |
| 502,670 | 1954 | Italy. |

OTHER REFERENCES

Prat et al.: German print application, 1,143,388, Feb. 7, 1963.

FRANK L. ABBOTT, *Primary Examiner.*

JOHN E. MURTAGH, *Assistant Examiner.*